United States Patent

[11] 3,586,055

| [72] | Inventor | William L. Wilson |
| | | Barberton, Ohio |
| [21] | Appl. No. | 724,571 |
| [22] | Filed | Apr. 26, 1968 |
| | | Division of Ser. No. 373,414, June 8, 1964, abandoned. |
| [45] | Patented | June 22, 1971 |
| [73] | Assignee | PPG Industries, Inc. |
| | | Pittsburgh, Pa. |

[54] METHOD AND APPARATUS FOR DISTRIBUTION OF GASES IN AN ANNULUS
7 Claims, 5 Drawing Figs.

[52] U.S. Cl. .................................................. 138/37, 23/277, 266/30
[51] Int. Cl. ...................................................... F15d 1/02
[50] Field of Search............................................ 23/202 V, 277; 138/37, 39; 266/29, 30; 431/8, 9; 55/462—465

[56] References Cited
UNITED STATES PATENTS

| 3,378,206 | 4/1968 | Poe et al. ..................... | 431/8 X |
| 2,188,920 | 2/1940 | Reece .......................... | 266/30 |
| 2,472,636 | 6/1949 | Weissman ..................... | 55/462 X |
| 2,760,771 | 8/1956 | Knappe ........................ | 266/30 X |

FOREIGN PATENTS

| 422,014 | 11/1925 | Germany....................... | 266/30 |
| 864,674 | 4/1961 | Great Britain................. | 266/30 |

*Primary Examiner*—Laverne D. Geiger
*Assistant Examiner*—Edward J. Earls
*Attorney*—Chisholm and Spencer ABSTRACT: The production of pigmentary metal oxides, e.g., titanium dioxide, by vapor phase oxidation of the corresponding metal halide, e.g., titanium tetrachloride, in a reaction zone is described. The results of ineffective mixing of reactant gases introduced into the reaction zone through an annulus id discussed and a method comprising deflecting the gas as it enters the annulus proposed for effecting more uniform mixing in the reaction zone.

PATENTED JUN 22 1971

INVENTOR
WILLIAM L. WILSON

BY Chisholm and Spencer
ATTORNEYS

INVENTOR
WILLIAM L. WILSON

3,586,055

METHOD AND APPARATUS FOR DISTRIBUTION OF GASES IN AN ANNULUS

CROSS-REFERENCE TO RELATED APPLICATIONS

This application is a division of my Application Ser. No. 373,414, filed June 8, 1964, now abandoned.

BACKGROUND OF THE INVENTION

In the production of titanium dioxide by the vapor phase oxidation of titanium tetrahalide either in the presence or absence of a fluidized bed, titanium tetrahalide is oxidized by reaction in the vapor phase with oxygen or an oxygen-containing gas in a relatively confined area maintained at a temperature above 700° C. in a range of about 800° C. to 1200° C., preferably not higher than 1600° C.

An important aspect of efficiently producing or making pigmentary titanium dioxide is the mixing of vaporous or gaseous reactant streams, e.g., vaporous $TiCl_4$ and oxygen. In the various vapor phase oxidation processes, it is especially useful and advantageous to introduce the reactant gas streams of titanium tetrahalide and oxygen-containing gas separately into the reaction zone by means of a series of concentric tubes or annuli. Reference is made to U.S. Letters Pat. No. 2,792,490 issued to Willcox and U.S. Letters Pat. No. 2,968,529 issued to Wilson.

In more sophisticated processes, such as disclosed in U.S. Letters Pat. No. 3,068,113 issued to Strain et al. and U.S. Letters Pat. No. 3,069,281 issued to Wilson, additional gas streams, e.g., inert gases, are separately introduced into the reaction zone via additional concentric tubes. In such arrangements, the number of concentric tubes employed will generally be a function of the number of different gas streams to be introduced into the reaction zone, although it may sometimes be desirable to introduce several gases through a single tube.

Since heat is frequently added to the vaporous reactants or other gases within these tubes, e.g., by reacting CO with $O_2$, or by plasma arc, the concentric arrangement of tubes may be commonly called a burner and the tubes referred to as burner tubes. Hereinafter, the term "gas introduction tubes" will be employed so as not to limit the invention solely to burner arrangements; that is, the present invention is intended to be employed in conjunction with any arrangement of concentric flow path particularly used in the production of pigmentary metal oxide by the vapor phase oxidation of a metal halide.

BRIEF SUMMARY OF THE INVENTION

This invention relates to novel apparatus and process for the distribution of a gas or gases. More specifically, this invention relates to novel apparatus and process for the distribution of a gas or gases in the production of metal oxides, particularly pigmentary titanium dioxide, by vapor phase oxidation process; that is, the reaction of a metal halide in the vapor phase with an oxygenating or oxygen-containing gas.

DETAILED DESCRIPTION

In accordance with this invention, the various gas streams are emitted from annuli flow paths formed by concentrically arranged tubes in a predictable uniform, concentric flow pattern and in a direction of flow parallel to the axis of the center of the arrangement or assembly of the concentric gas introduction tubes such that complete and efficient mixing is obtained. By so uniformly and axially emitting the gases from the annuli or concentric flow paths, it is further possible to operate a pigmentary $TiO_2$ vapor phase oxidation process continuously for long periods of time without oxide scale or growth forming on the lips of the gas introduction tubes extending into the reaction chamber.

However, when the process is not operated in accordance with this invention, e.g., when one or more of the gas streams is emitted into the reactor at an angle to the axis of the concentric tubes, then oxide scale or growth quickly forms on the lips of the gas introduction tubes eventually causing plugging of the tubes and shutdown of the process. Furthermore, during the growth buildup, part of the scale will break off in the form of coarse, nonuniform particles which hinder the formation and recovery of a pigmentary metal oxide. Likewise, the growth buildup diverts the flow of the gases and hinders efficient mixing to such an extent that an incomplete reaction results and the formation of pigmentary metal oxide is further prevented.

In the practice of this invention, such scale buildup or burner growth is prevented and highly-dispersed pigmentary metal oxide, particularly titanium dioxide, of small, uniform particle size and having improved tinting strength is produced. More particularly, in accordance with the practice of this invention, there is obtained a continuous vapor phase oxidation process wherein complete mixing and reaction of the reactants within the reaction zone is achieved with a resulting product having highly pigmentary properties.

In the present invention, the inert and/or reactant gas stream is introduced to the annulus or annuli in a manner such that the gas is distributed over the entire cross-sectional area of the annulus and is emitted from the burner into the reaction zone in a predictable uniformly concentric flow pattern with a direction of flow parallel to the axis of the burner assembly; that is, the present technique makes possible the controllable metering and mixing of the various gas streams introduced into the reactor in a predictable, useful, and advantageous manner.

More particularly, the gas stream is introduced to the annular space formed by the spaced, adjacent boundary surfaces of the concentric tubes by means of an elongated tube connected substantially transverse to the concentric tubes assembly, the end of the elongated tube connected to the concentric tubes assembly containing a deflection or distribution plate which directs and distributes the gas throughout the cross-sectional area of the annulus.

The invention will be better understood by reference to the drawing and the FIGURES thereon.

Figure 1:
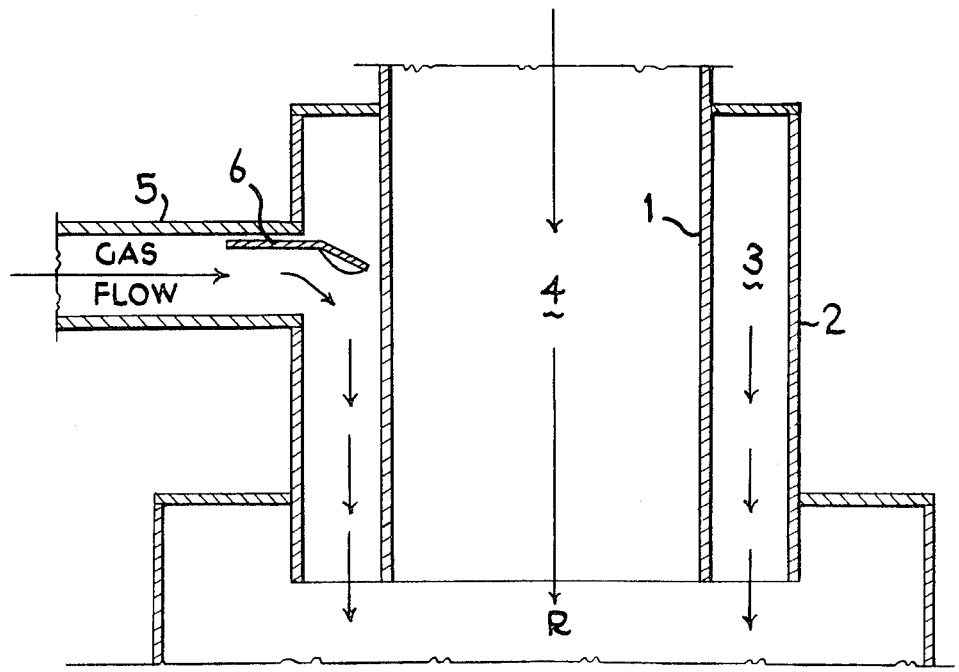
FIG. 1 is a cross-sectional view of a preferred embodiment of this invention showing an elongated tube attached to an annulus.

More particularly, in FIG. 1, there is shown a elongated tube 1 having an inside chamber 4 through which a gas or vapor, e.g., a gaseous reactant, preferably oxygen, is introduced from the top in the direction indicated by the arrows. External to tube 1 is concentric tube 2, which is spaced from adjacent tube 1 to form annulus 3. Annulus 3 is closed at one end, has an inlet opening near that end and a gas exit at the other end. Gas is introduced through elongated tubular means 5 and the gas inlet opening in tube 2 into annulus 3, the gas being distributed uniformly through the cross-sectional area of the annulus by deflector means, e.g., deflection plate 6, which is mounted adjacent the intersection of the annulus and tube such that the gas from the annulus 3 is emitted into the reactor R in a uniformly concentric flow pattern with respect to the gas stream being emitted into the reactor from tube 1.

Figure 2:
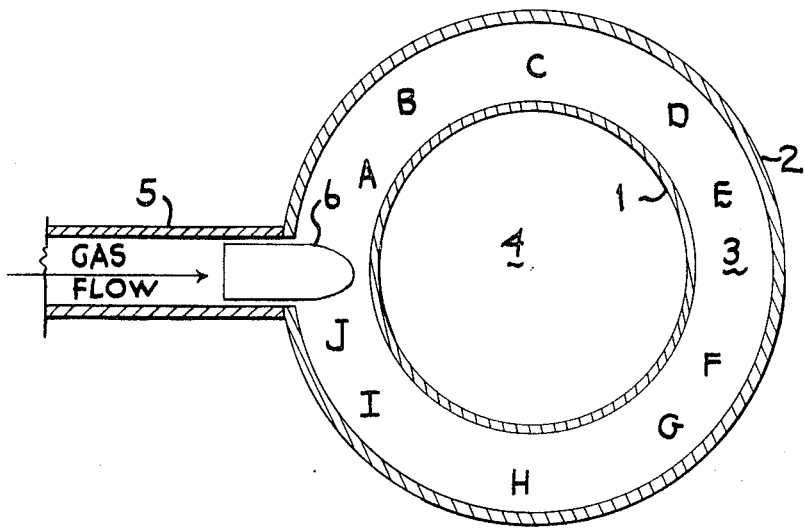
FIG. 2 is a cross-sectional view of FIG. 1.

FIG. 2 is a cross-sectional view of FIG. 1 with letters A, B, C, D, E, F, G, H, I, and J indicating the points at which the gas flow in the annulus was measured as to be noted hereinafter in the examples.

Figure 3:
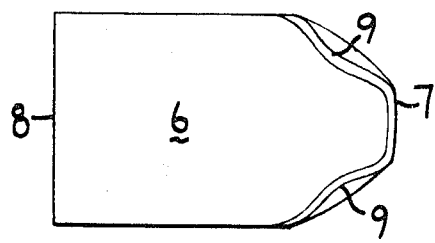
FIG. 3 is a bottom plan view of the deflector or distribution plate inserted in the elongated tube in FIGS. 1 and 2.
Figure 4:
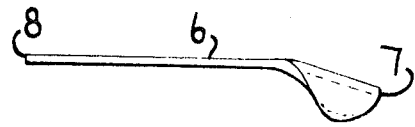
FIG. 4 is a side view of the deflector plate illustrated in FIG. 3.

FIGS. 3 and 4 respectively show a preferred embodiment of the gas deflector or distribution plate 6 to be inserted in tube 5 in FIGS. 1 and 2, one end 7 of the plate 6 being curved in a downwardly direction with respect to opposite end 8, the corners 9 of end 7 being curved inwardly as fins.

Figure 5:
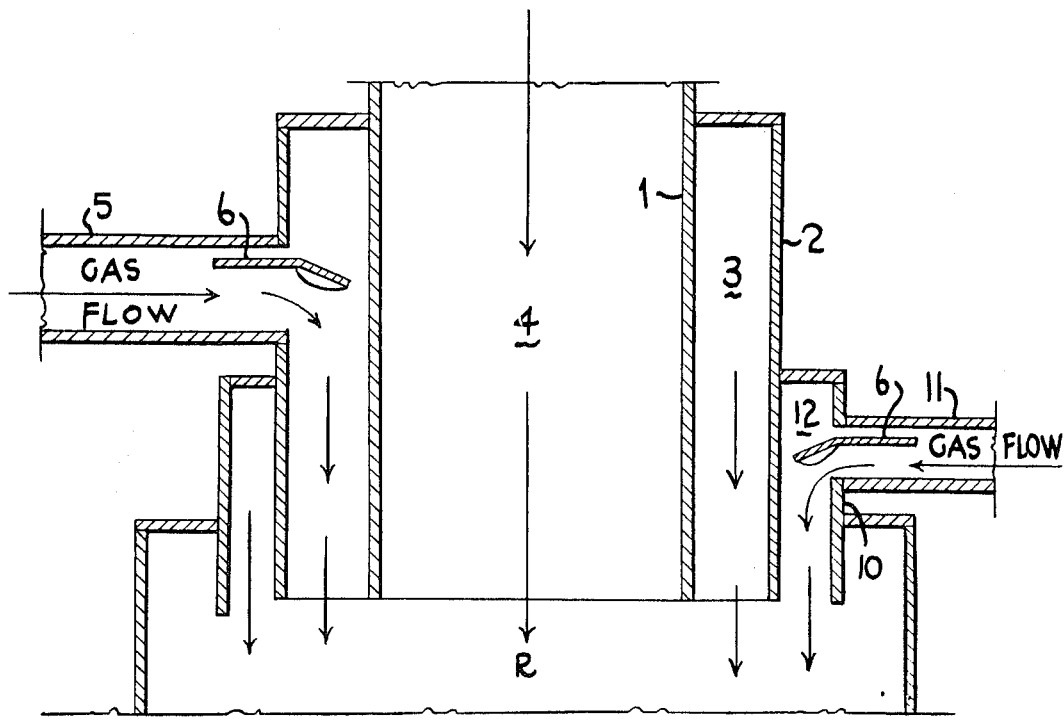
FIG. 5 is a double embodiment of the process of FIG. 1.

FIG. 5 represents a double embodiment of FIG. 1 wherein an additional concentric tube 10 is provided thereby forming a further annulus 12, with gas being supplied to the annulus 12 through elongated tube 11 in which there is inserted a further deflector plate 6.

In the preferred practice of the process as shown in FIG. 5, an oxygen-containing gas is introduced through tube 4 and the vaporous metal halide reactant fed into annulus 12 through tube 11. An inert gas, e.g., chlorine, is fed into annulus 3 through tube 5. Thus, three separate and concentric streams are emitted into the reactor R with the inert stream being emitted from annulus 3 serving as a shielding layer between the reactant streams being emitted from tube 4 and annulus 12.

In a preferred embodiment of this invention as shown in FIGS. 1, 2 and 5, the deflector means 6 has a first portion fixed internally within tube 5 and extending in the direction of the path of flow of gas in tube 5. A second portion extends into the annulus 3 between and spaced from the walls thereof to a point ranging from one sixty-fourth to 2 inches, preferably one-sixteenth of an inch to one-fourth of an inch, from the innermost diameter of the annulus, that is, the outside circumference of tube 1. The second portion of deflector means 6, i.e., end 7, is bent toward the gas exit of the annulus so as to be positioned at an angle to the first portion and to extend in the direction of the gas exit.

In this preferred embodiment, a gas stream is introduced through tube 5 toward annulus 3. As the gas stream contacts deflector plate 6, its flow pattern is split and its velocity and pressure decreased, the gas thereby entering into annulus 3 at a reduced flow rate and pressure and expanding uniformly throughout the annulus. The gas stream then continues in a downwardly direction and is emitted into reactor R in a predictable uniformly concentric flow pattern with respect to the gas emitted from tube 1 and the common axis of tubes 1 and 2. to one-fourth of an inch, from the innermost diameter of the annulus, that is, the outside circumference of tube 1. The second portion of deflector means 6, i.e., end 7, is bent toward the gas exit of the annulus so as to be positioned at an angle to the first portion and to extend in the direction of the gas exit.

In this preferred embodiment, a gas stream is introduced through tube 5 toward annulus 3. As the gas stream contacts deflector plate 6, its flow pattern is split and its velocity and pressure decreased, the gas thereby entering into annulus 3 at a reduced flow rate and pressure and expanding uniformly throughout the annulus. The gas stream then continues in a downwardly direction and is emitted into reactor R in a predictable uniformly concentric flow pattern with respect to the gas emitted from tube 1 and the common axis of tubes 1 and 2.

When the deflector plate is removed from tube 5, and gas is introduced into annulus 3, the momentum of the gas carried a disproportionate amount of the gas to the far side of the annulus 3 opposite the side of the annulus at which tube 5 is connected, thereby causing more gas flow through the annulus at said opposite side; that is, the gas is not uniformly and predictably distributed within the annulus but flows downwardly through the annulus on the side opposite to which it enters. As the gas stream emits into the reaction chamber R, it immediately flows at an angle inwardly into the reactant gas stream, e.g., oxygen, flowing from tube 1 thereby hindering the efficient and complete mixing of the two streams with a resulting oxide growth immediately forming at the lips or exit openings of tubes 1 and 2.

Although it is preferred that tube 5 be substantially transverse or perpendicular to the common longitudinal axis of the tubes 1 and 2 (as shown in Fig. 1) the longitudinal axis of tube 5 may be connected at any angle ranging from 10° to 170°, preferably 45° to 135°.

The width of the deflector plate is at least equal to the radius of tube 5, and is preferably equal to twice the radius, that is, the diameter of the tube.

The angle at which end 7 is downwardly curved with respect to end 8 ranges from 1° to 75°, preferably 3° to 30°. Thus, the deflected gas follows a path of flow which intersects the original path of flow through tube 5 and which extends toward the gas exit of the annulus. Corners or fins 9 are curved inwardly at an angle ranging from 5° to 135°, preferably 45° to 90°.

Although FIGS. 1, 2 and 5 illustrate single and double embodiments of the present invention, it is understood that additional embodiments may be employed depending upon the number of concentric tubes, the number of embodiments generally being equal to the number of tubes minus 1. Thus in the production of pigmentary titanium dioxide, it is possible to use as many as 6 or 8 concentric tubes with 5 to 7 annuli, 4 or more gases, and 6 or more gaseous streams, with some of the gases being introduced in separate streams through 2 or more annuli.

Where the present invention is employed to produce pigmentary titanium dioxide, the vaporous metal halide reactant, e.g., titanium tetrahalide, is preferably introduced into the reactor chamber from an annulus or tube at a velocity of 100 to 60,000 feet per minute calculated at 150° C. and 1 atmosphere. The oxygen-containing stream is introduced at 25 to 50,000 feet per minute calculated as pure oxygen gas at 0° C. and 1 atmosphere. The inert gas, e.g., chlorine, is introduced at 10 to 5000 feet per minute, calculated at 0° C. and 1 atmosphere.

The cross-sectional area of the elongated tube 5 and concentric tubes is preferably circular. However, it is also possible to employ other geometric shapes and designs in conjunction with the present process, this being deemed to be within the skill of a mechanic in the art.

Likewise, the present invention may be practiced to introduce and distribute gas into the central concentric tube, e.g., tube 1 in FIGS. 1 and 2. In practice, it is usually preferred to introduce the gas stream, e.g., oxygen, from the top of the tube assembly. However, in some instances, it is necessary to introduce the gas stream at an angle in which case the present invention is valuable to prevent swirling of the gas stream; the swirling of the stream also causes poor mixing and the formation of poor quality pigmentary metal oxide.

In a further modification of the present process, additional reagents in a solid, liquid or vaporous state, e.g., nucleating and/or rutile promoting agents, may be introduced into the gas streams flowing through tubes 5 or 11, e.g., by means of a tube connected at an angle to the introduction tube 5 or 11. By nucleating agents and/or rutile promoter agents, it is meant aromatic hydrocarbons and/or metals which form a white oxide upon oxidation, e.g., aluminum, silicon, and other metals such as disclosed in Canadian Pat. Nos. 631,871 and 639,659 and U.S. Letters Pat. No. 3,068,113. Although metal particles may be employed, it is also feasible to employ the halide or white oxide of the metal.

The temperatures of the various gases introduced through the concentric tubes may range from 100° C. to 2500° C., $TiCl_4$ preferably being below 500° C. whereas the oxygen or an inert gas may be preheated by the combustion of a fuel, CO, or sulfur-containing compound to temperatures in excess of 1500° C., or in excess of 2000° C. where a plasma arc is employed.

The term inert gas as employed herein means any gas which is inert to the reaction of the metal halide and oxygen. Examples of such inert gases, not by way of limitation, are argon, nitrogen, helium, krypton, xenon, chlorine, carbon dioxide, or mixtures thereof. Carbon monoxide may also be introduced in place of, in addition to, or mixed with an inert gas as defined hereinabove, the carbon monoxide being introduced as a means of providing heat to the reaction zone for the sustaining of the reaction, the CO reacting with the oxygen to form $CO_2$. Likewise, sulfur-containing compounds as disclosed in U.S. Letters Pat. No. 3,105,742 may be introduced through the annulus or annuli alone or mixed with a gaseous reactant or inert gas. Thus, any gaseous stream, e.g., metal halide, oxygen, inert gas, carbon monoxide, sulfur-containing compounds, natural gas or mixtures of same, may be added to the annulus or annuli of the concentric tubes by means of this invention.

The present process may also be employed in conjunction or combination with the process of copending U.S. Application Ser. No. 360,937 of Benner and Loehr, filed Apr. 20, 1964, now U.S. Pat. No. 3,467,498. Thus, for example, the elongated tube 5 of FIG. 1 may be provided with a uniformly increasing diameter and cross-sectional area in the direction of gas flow toward the annulus to thereby aid the deflector plate 6 in the distribution of the gas in the annulus.

The following are typical examples.

EXAMPLE I

A concentric tube arrangement as illustrated in FIGS. 1 and 2 was employed, tube 1 having an outside diameter of 6.75 inches and tube 2 having an inside diameter of 7.50 inches, annulus 3 thereby being 0.375 inches wide. Tube 1 and 2 were 24 inches long. A tube 5 was then attached to tube 2 at a 90° angle at the axes of tubes 1 and 2, tube 5 having an internal diameter of 2 inches.

A gas distribution plate as shown in FIGS. 3 and 4 was inserted in tube 5 as shown in FIGS. 1 and 2, the plate being 2 inches wide by 2 15/32 inches long by one-sixteenth inch thick, the end 7 being curved downwardly with respect to end 8 at an angle of about 4°. The corners 9 were curved one-half inch inwardly at an angle of about 85°.

An oxygen-containing gas at the rate of 14.3 feet per second (18.75 CFM) was introduced through the 2 inch tube into the annulus. Gas flow in feet per second was then measured at varying points in the annulus with the results shown in Table 1.

EXAMPLE II

The conditions of Example I were repeated except that the distribution or deflection plate was removed from tube 5 and the process operated not in accordance with the invention. Gas flow rate and distribution was measured at various points in the annulus with the results shown in Table 1.

EXAMPLE III

The conditions of Example I were repeated except that tube 5 was 1½ inches in diameter and the distribution plate was 1 7/16 inches wide. The oxygen-containing gas was introduced through tube 5 at the rate of 25.5 feet per second. The gas rate and distribution was measured at various points in the annulus with results shown in Table 1.

EXAMPLE IV

The conditions of Example III were repeated without the distribution plate. The rate of flow through the annulus was measured at various points and the results shown in Table 1.

EXAMPLE V

Using the process of FIG. 1, 37 gram-moles per minute of oxygen at 1000° C. is continuously fed through internal tube 1 having an internal diameter of 5 inches while 32 gram-moles per minute of titanium tetrachloride with $TiCl_4$ at 600° C. is continuously fed into annulus 3 having a maximum diameter of 8 inches, the $TiCl_4$ being fed through tube 5 having an internal diameter of 5 inches. Tube 5 is provided with a deflector plate 6 identical to that employed in Example I.

One hundred to 125 grams per minute of vaporous aluminum trichloride at 300° C. and 0.18 gram-moles per minute of liquid $SiCl_4$ is added to the $TiCl_4$ stream prior to the introduction of $TiCl_4$ through tube 5.

The process is operated continuously for over 150 hours. A typical $TiO_2$ product sample during the run has an average tinting strength (Reynolds scale) of 1570.

EXAMPLE VI

The conditions of Example V are repeated without deflector plate 6 being inserted in the tube 5. After 30 minutes of operation, the tubes 1 and 2 plug at the reactor and thereof due to oxide growth and buildup. Typical rutile $TiO_2$ product samples during the run have an average tinting strength of 1300.

EXAMPLE VII

Using the double embodiment process of FIG. 5, 37 gram-moles per minute of oxygen at 1100° C. is continuously fed through internal tube 4 having an internal diameter of 5 inches while 32 gram-moles per minute of titanium tetrachloride at 600° C. is continuously fed through tube 11 having an internal diameter of 5 inches into annulus 12 having a maximum diameter of 12 inches.

One hundred grams per minute of vaporous aluminum trichloride at 300° C. and 0.19 gram-moles per minute of liquid $SiCl_4$ is added to the $TiCl_4$ stream before it is introduced through tube 11.

Chlorine at 400° C. is continuously fed at the rate of 6 gram-moles per minute into annulus 3 having a maximum diameter of 8 inches, the chlorine being supplied through tube 5 having an internal diameter of 5 inches.

Both tubes 5 and 11 are provided with a deflector plate 6 identical to that employed in Example I.

The process is operated continuously for over 200 hours without plugging of the tubes 1, 2 and 10 at the reactor and thereof due to oxide growth and buildup. Typical rutile $TiO_2$ product samples during the run have an average tinting strength of 1650.

EXAMPLE VIII

The conditions of Example VII are repeated without deflector plates 6 being inserted in tubes 5 and 11. After 90 minutes of operation, the tubes 1, 2, and 10 plug at the reactor end thereof due to oxide 4, and buildup. Typical $TiO_2$ product samples during the run have an average tinting strength of 1425.

Although this invention has been described with particular reference to titanium tetrahalide, e.g., $TiCl_4$, $TiBr_4$, and $TiI_4$, it may be employed in the production of other pigmentary metal oxides.

The term metal as employed herein is defined as including those elements exhibiting metallike properties, including the metalloids. Examples, not by way of limitation but by way of illustration, of pigmentary metal oxides which may be produced by the aforementioned process are the oxides of aluminum, arsenic, beryllium, boron, gadolinium, germanium, hafnium, lanthanum, iron, phosphorus, samarium, scandium, silicon, strontium, tantalum, tellurium, terbium, thorium, thulium, tin, titanium, yttrium, ytterbium, zinc, zirconium, niobium, gallium, antimony, lead and mercury.

Likewise, it is to be understood that any of the above teachings may be employed in any vapor phase oxidation process for providing a pigmentary metal oxide either in the absence or presence of a fluidized bed.

Obviously, many modifications and variations of the present invention are possible in light of the above teachings.

The above description of the invention has been given for purposes of illustration and not limitation. Various changes and modifications which fall within the spirit of the invention and scope of the appended claims will become apparent to the skilled expert in the art. Thus, it will be understood that the in-

TABLE 1

| | Flow distribution in annulus (feet per second) | | | | | | | | | |
|---|---|---|---|---|---|---|---|---|---|---|
| | A | B | C | D | E | F | G | H | I | J |
| Example I (with distribution plate) | 5.2 | 5.7 | 5.2 | 5.4 | 5.9 | 5.4 | 5.1 | 4.9 | 5.8 | 5.4 |
| Example II (without distribution plate) | | 4.4 | 5.8 | 6.6 | | | 5.3 | 5.8 | 3.6 | |
| Example III (with distribution plate) | 5.5 | 5.3 | 5.3 | 5.4 | 5.6 | 5.3 | 5.1 | 5.3 | 5.5 | 5.6 |
| Example IV (without distribution plate) | 4.2 | 4.8 | 5.9 | 6.4 | 6.1 | 6.1 | 6.3 | 5.4 | 4.5 | 4.2 | vention is in no way to be limited except as set forth in the following claims.

I claim:

1. A method for establishing a uniform, concentric pattern of flow of a gas in an elongated annular space between boundary surfaces, said space being provided with an inlet opening and terminating in a gas exit and having a longitudinal axis extending through said space to said gas exit comprising the steps of flowing gas through said inlet into said annular space along a flow path disposed at an angle of from 10° to 170° with respect to the longitudinal axis of said annular space and deflecting a substantial portion of said gas introduced through said inlet into said annular space at a location between the boundary surfaces of said space and opposite said gas inlet opening, said portion of said gas being deflected along a path of flow which intersects said first-named path of flow and extends toward the gas exit of said annular space, said intersecting paths of flow providing an angle of from 1° to 75° which faces said gas exit.

2. Apparatus for gas distribution comprising an annulus formed by concentric tubes having a common longitudinal axis, each tube having a wall spaced from that of the adjacent tube to provide said annulus, the outermost of said spaced walls being provided with a gas inlet opening, said annulus being closed at one end and having a gas exit at the other end, tubular means for introducing gas into said annulus through said inlet opening, said tubular means being connected to the outermost of said spaced walls at said opening and having a longitudinally extending axis disposed at an angle of from 10° to 170° with respect to the common longitudinal axis of said annulus, a deflector means mounted adjacent the intersection of said annulus and said tubular means, said deflector means having a first portion disposed within said tubular means and extending in the direction of the path of flow of the gas in said tubular means and a second portion disposed in said annulus between and spaced from the walls thereof, said second portion being bent toward the exit of said annulus so as to be positioned at an angle to said first-named portion and extend in the direction of said gas exit of said annulus.

3. The apparatus of claim 2 wherein said tubular means is connected to said annulus at an angle of from 45° to 135° with respect to the common longitudinal axis of said concentric tubes.

4. The apparatus of claim 2 wherein said first portion of said deflector means is parallel to the axis of said tubular means.

5. The apparatus of claim 2 wherein said second portion of said deflector means extends to within one-sixteenth inch to one-fourth inch of said wall of the innermost of said concentric tubes.

6. The apparatus of claim 2 wherein said second portion of said deflector means has spaced side edges and each said side edge is bent in the direction of the gas exit of said annulus.

7. The apparatus of claim 2 wherein said second portion of said deflector means is bent at an angle of from 1° to 75° with respect to the axis of said first named portion of said deflector means.